Jan. 17, 1928.  1,656,857
J. R. HEGE
LUBRICANT SUPPLY SYSTEM
Filed July 6, 1926
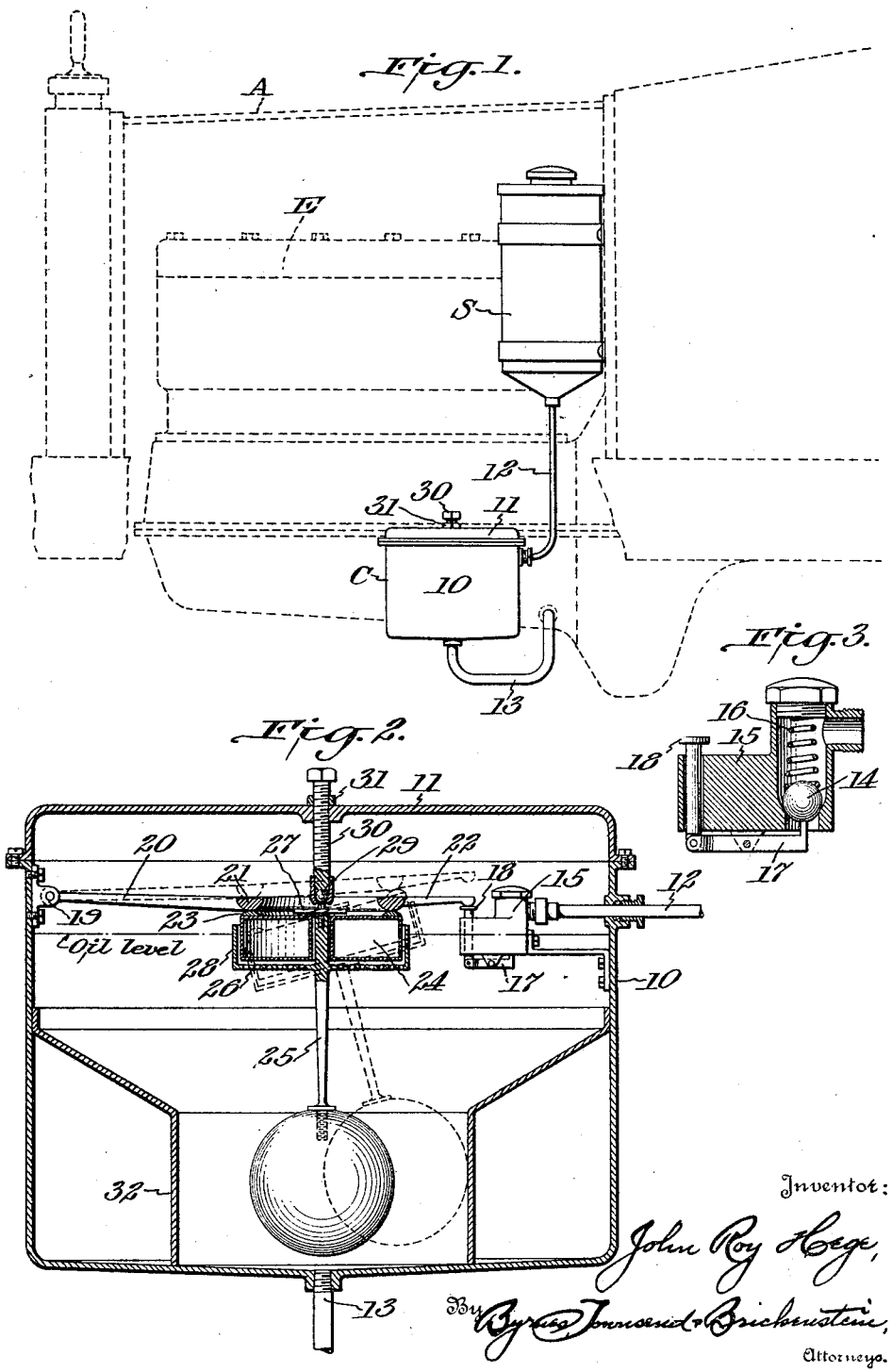

Patented Jan. 17, 1928.

UNITED STATES PATENT OFFICE.

1,656,857

JOHN ROY HEGE, OF WINSTON-SALEM, NORTH CAROLINA.

LUBRICANT-SUPPLY SYSTEM.

Application filed July 6, 1926. Serial No. 120,814.

This invention relates to a lubricant supply system and particularly to a system for delivering lubricant to an oil sump only when the supporting body or frame on which the sump is mounted occupies its normal position with respect to the horizontal.

The invention will be described with reference to the delivery of lubricant to an automobile engine, but it will be apparent that it is applicable to other portable power plants, such as tractors, marine engines, and the like.

Supply systems of the type in which lubricant is automatically delivered from a supply tank to an oil sump for maintaining a predetermined quantity of lubricant therein are open to the serious objection that the tilting of the power plant may cause a fictitious fall in the oil level which opens the inlet valve, thereby permitting additional lubricant to enter the sump and resulting in an abnormal level when the power plant returns to its normal position.

An object of the invention is to provide a portable power plant with a lubricant supply system which will deliver lubricant to the oil sump only when the power plant occupies its normal position. A further object is to provide an internal combustion engine with a lubricant supply system which will deliver lubricant by gravity to the oil sump to maintain a predetermined level therein, and which will not deliver excess lubricant thereto when the engine is tilted from its normal position.

These and other objects of the invention will be apparent from the following specification when taken with the accompanying drawings, in which:

Fig. 1 is a side elevation showing the invention applied to an automobile engine, the engine and portions of the automobile being shown in dotted lines;

Fig. 2 is an enlarged vertical section through the regulating chamber; and

Fig. 3 is an enlarged sectional detail of the inlet valve.

In the drawings, the reference character A indicates an automobile having an engine E to which lubricant is delivered from the supply tank S through a regulating chamber C. The chamber C is so situated with respect to the desired oil level in the sump of engine E that the flow of lubricant thereto may be regulated by a float in the chamber.

The chamber C preferably takes the form of a cylindrical shell 10 having a removable closure 11, and an inlet 12 and outlet 13 which communicate, respectively, with the supply tank and the oil sump. The lubricant inlet is provided with a suitable valve which, as shown, may take the form of a ball 14, yieldingly held to its seat in the casing 15 by a spring 16 and adapted to be moved from the seat by a lever 17. To permit the float actuation of the valve, the lever 17 is provided with an operator 18 which is slidably mounted on an extension of the valve casing 15.

The casing 15 is located at or adjacent one side of the shell 10, and with the valve operator 18 toward the inside of the chamber. At the opposite wall of the shell 10, a horizontally-arranged bearing 19 acts as the pivotal support for a lever 20 which has an annular central portion 21 and a free end 22 which is adapted, under certain conditions, to depress the valve operator 18. The annular portion 21 is in vertical alignment with and normally rests upon an annular bead 23 which lies at the upper periphery of the float 24. The weight of the lever is of course such that it will depress the operator 18 to open the valve when the float 24 falls below a predetermined level.

The construction, so far as described above, is similar to known systems of automatic gravity feeds and is open to the objection that a tilting of the chamber C may result in a fictitious fall in the oil level which will result in the opening of the valve. To prevent the valve from opening when the chamber is tilted, a weighted member or pendulum 25 is passed vertically through the float 24 and provided with spaced radial flanges 26 and 27 for limiting the movement of the float axially of the pendulum. The outer edge of the lower flange 26 is preferably turned upwardly to form a sleeve flange 28 about the float and the flange 26 is perforated to permit lubricant to flow into the sleeve 28. The upper flange 27 is formed as a part of, or secured to the pendulum arm by means of the threaded member 29 which terminates in a spherical head forming part of the universal joint by which the pendulum is supported. The socket portion of the joint is carried by a bolt 30 which passes through the closure 11 and is fixed thereto by a lock nut 31. A cylindrical sleeve 32 is placed about the lower end of the pendulum to limit the relative angular displacement of the pendulum and chamber. The sleeve is secured to the wall of the chamber in any suitable manner, and when imperforated may form the lower side walls of the lubricant chamber.

When the internal combustion engine E occupies the normal horizontal position, oil will flow from the tank S through chamber C and into the oil sump until the latter contains a predetermined quantity of oil. As the oil rises to the predetermined level in the oil sump and in the chamber C, the float 24 rises and lifts the lever arm 22 from engagement with the valve operator 18. The spring valve then closes and remains closed until the float drops to throw the weight of the lever upon the operator 18. When the engine is tilted, however, the connection between the float and the valve operator is broken. In Fig. 2, the dotted lines illustrate the relative position of the lever and valve when the regulating chamber is given a small clockwise rotation. The axis of the pendulum 25 and the float 24 remains vertical but the lever support 19 and the valve casing 15 are rotated in a clockwise direction about the ball and socket joint of the pendulum. The same relative movement may be visualized by assuming that the regulating chamber remains vertical and that the pendulum is given an angular displacement. The pendulum and float operate as a bell crank lever to force the free end 22 of the operating lever away from the valve operator. Due to the annular portion 21 of the lever this operation takes place irrespective of the particular vertical plane in which the relative movement of the pendulum takes place.

It will be understood that the invention is not limited to the particular supply system illustrated herein, since many changes which may be made in the several parts, their relative size, shape and relationship, fall within the spirit of my invention as set forth in the following claims:

I claim:

1. An internal combustion engine lubricating system of the type in which lubricant is delivered by gravity from an elevated tank to the oil sump to maintain a predetermined quantity therein, characterized by means permitting lubricant to flow from said tank to said oil sump when the lubricant therein falls below a predetermined level, and means rendering said first means inoperative when the engine is tilted from its normal horizontal position.

2. A lubricant supply system for an internal combustion engine comprising a chamber located at the normal oil level of said engine sump, and communicating therewith, an elevated supply tank, a valved pipe for delivering lubricant from said tank to said chamber, a float in said chamber for controlling the valve in said pipe, and means rendering said float inoperative to open said valve when the engine is tilted from its normal horizontal position.

3. A lubricant supply system comprising a chamber in which a predetermined quantity of liquid is to be maintained, a lubricant inlet opening into said chamber and a valve controlling the same, a float and means controlled thereby for opening said valve, and means rendering said valve opening means inoperative when said chamber is tilted from its normal horizontal position.

4. In a lubricant supply system, a float control comprising a float chamber, a valve controlling the inlet of lubricant thereto, a float, a lever resting on said float and having a portion for operating said valve when the float drops below a predetermined level, and means operative upon the tilting of said chamber from its normal position to move said lever away from valve-opening position.

5. In a lubricant supply system, a chamber, an inlet thereto and a valve in said inlet, a pendulum, a universal joint support for the upper end thereof, a float in said chamber, means operable to open said valve upon the movement of said float below a predetermined level, and means for rendering said valve opening means inoperative upon the tilting of said chamber.

6. In a lubricant supply system, a chamber having a top closure therefor, an inlet into said chamber and a valve in said inlet, a universal joint support depending from said closure, a pendulum carried by said support, a float in said chamber, means restricting said float to a limited movement axially of said pendulum, and a lever for opening said valve when said float drops below a predetermined level, said lever being pivoted to said chamber and resting on said float, whereby the float moves the lever away from valve opening position upon the tilting of the chamber.

7. The invention as set forth in claim 6, wherein said support is adjustable vertically of the chamber for regulating the predetermined level of the lubricant therein.

In testimony whereof, I affix my signature.

JOHN ROY HEGE, M. D.